United States Patent
Tomimatsu et al.

[19]

[11] Patent Number: 6,037,076
[45] Date of Patent: Mar. 14, 2000

[54] MOLTEN CARBONATE FUEL CELL AND METHOD OF MANUFACTURING RETAINING MATERIAL FOR ELECTROLYTE BODY OF MOLTEN CARBONATE FUEL CELL

[75] Inventors: Norihiro Tomimatsu, Kawasaki; Hideyuki Ohzu, Yokohama; Yoshihiro Akasaka, Kawasaki; Kazuaki Nakagawa, Yokohama, all of Japan

[73] Assignee: Kabushiki Kaisha Toshiba, Kawasaki, Japan

[21] Appl. No.: 09/119,752

[22] Filed: Jul. 21, 1998

Related U.S. Application Data

[62] Division of application No. 08/725,170, Oct. 3, 1996.

[30] Foreign Application Priority Data

Oct. 3, 1995 [JP] Japan .................................... 7-255909

[51] Int. Cl.[7] .................................................. H01M 8/14
[52] U.S. Cl. ........................................................ 429/46
[58] Field of Search ................................ 429/46; 423/600

[56] References Cited

U.S. PATENT DOCUMENTS

| 3,878,296 | 4/1975 | Vine et al. . |
| 5,217,702 | 6/1993 | Kullberg . |
| 5,252,315 | 10/1993 | Higashiyama et al. . |

FOREIGN PATENT DOCUMENTS

| 151614 | 6/1988 | Japan . |
| 151615 | 6/1988 | Japan . |
| 63-294668 | 12/1988 | Japan . |
| 80319 | 3/1990 | Japan . |
| 2-243511 | 9/1990 | Japan . |
| 233519 | 9/1990 | Japan . |
| 6-290799 | 10/1994 | Japan . |
| 1564115 | 5/1990 | Russian Federation . |
| WO92/04496 | 3/1992 | WIPO . |

OTHER PUBLICATIONS

K. Kinoshita et al, "Synthesis of Fine Particle Size Lithium Aluminate for Application in Molten Carbonate Fuel Cells", Mat. Res. Bull. vol, 14, No. 10, pp. 1357–1368 (Oct. 1979).

*Primary Examiner*—Wayne Langel
*Attorney, Agent, or Firm*—Oblon, Spivak, McClelland, Maier & Neustadt, P.C.

[57] ABSTRACT

A molten carbonate fuel cell comprises a fuel electrode, an oxidizing agent electrode, and an electrolyte body prepared by impregnating a porous body including a retaining material and a reinforcing material with an electrolyte containing an alkali carbonate. The retaining material consists essentially of α-lithium aluminate (α-LiAlO$_2$) having at most 0.60° of a half value width of (104) peak in an X-ray powder diffractometry.

14 Claims, 3 Drawing Sheets

MOLTEN CARBONATE FUEL CELL AND METHOD OF MANUFACTURING RETAINING MATERIAL FOR ELECTROLYTE BODY OF MOLTEN CARBONATE FUEL CELL

This application is a division of application Ser. No. 08/725,170 Oct. 3, 1996.

BACKGROUND OF THE INVENTION

1. Field of the Invention

The present invention relates to a molten carbonate fuel cell and a method of manufacturing a retaining material for an electrolyte body included in the molten carbonate fuel cell, particularly, to a molten carbonate fuel cell comprising an improved electrolyte body interposed between a pair of electrodes made of a conductive material and to a method of manufacturing of improved the retaining material.

2. Description of the Related Art

FIG. 1 shows the basic construction of a molten carbonate fuel cell. As shown in the drawing, the cell comprises an electrolyte body 3 holding an electrolyte consisting of an alkali carbonate. The electrolyte body 3 is held between a pair of conductive electrodes, i.e., an anode 1 and a cathode 2. A fuel gas ($H_2$, $CO_2$) is supplied to the anode 1 through a supply port 6 formed in a housing 4a, with the electrolyte body 3 kept molten under high temperatures. Likewise, an oxidizing gas (air, $CO_2$) is supplied to the cathode 2 through a supply port 8 made in the housing 2. Under these conditions, reactions (1) and (2) given below take place on the surfaces of the anode 1 and cathode 2, respectively, so as to operate the fuel cell:

$$H_2 + CO_3^{2-} \rightarrow H_2O + CO_2 + 2e^- \quad (1)$$

$$1/2 O_2 + CO_2 + 2e^- \rightarrow CO_3^{2-} \quad (2)$$

The electrolyte body used in the molten carbonate fuel cell comprises an electrolyte consisting essentially of a mixture of alkali carbonates, a porous body consisting of a retaining material for preventing the electrolyte, which is turned into liquid during operation of the cell at high temperatures, from flowing out of the electrolyte body, and a reinforcing material for preventing the electrolyte body from being cracked when the electrolyte body temperature is elevated. The electrolyte is prepared by mixing at least two of alkali carbonates selected from the group consisting of $LiO_2CO_3$, $K_2CO_3$ and $Na_2CO_3$. A fine powder of γ-lithium aluminate having a particle diameter of 0.05 to 2.0 μm is used as the retaining material. Further, lithium aluminate having a particle diameter of 10 to 100 μm is used as the reinforcing material.

The electrolyte body functions as a medium of movement of carbonate ions ($CO_3^{2-}$) and as a barrier layer for preventing reaction gases generated on the surfaces of the anode and cathode from being mixed directly with each other (gas cross-over). To enable the electrolyte body to perform these functions sufficiently, it is necessary for the electrolyte to be retained sufficiently in the electrolyte body. It should be noted that the flow-out of the electrolyte (electrolyte loss) causes not only an increase in the internal resistance of the cell but also generation of the gas cross-over.

It was customary in the past to prepare the electrolyte body by a matrix method in which a porous body having an appropriate fine structure is formed by using the retaining material and the reinforcing material noted above, followed by impregnating the resultant porous body with an electrolyte consisting of a mixture of the alkali carbonates noted above.

In the conventional electrolyte body prepared by the matrix method, however, γ-lithium aluminate used as the retaining material is turned into α-lithium aluminate during operation of the fuel cell over a long period of time. This change in the phase of lithium aluminate is accompanied by agglomeration of the retaining material particles and by growth of the particles, leading to changes in the fine structure of the porous body (matrix). As a result, coarse pores are generated in the electrolyte body. It follows that an electrolyte loss is brought about, leading to a short life of the fuel cell.

Several measures have been proposed to date in an attempt to overcome the above-noted difficulties inherent in the prior art. For example, Japanese Patent Disclosure (Kokai) No. 63-294668 discloses a technique of using as a retaining material made of lithium aluminate containing as a main component α-lithium aluminate having an average particle diameter of 0.1 μm. However, the agglomeration or growth of the retaining material particles, which causes changes in the fine structure of the matrix, fails to be prevented even in the case of using an electrolyte body containing α-lithium aluminate as a main component. It follows that an electrolyte loss is brought about, leading to a short life of the fuel cell, as already pointed out.

Further, Japanese Patent Disclosure No. 2-243511 discloses a technique of carrying out reaction of γ-lithium aluminate having a specific surface area of 20 $m^2$/g within a melt to obtain α-lithium aluminate having a low specific surface area. However, it is necessary to carry out the reaction for at least 5,000 hours for obtaining α-lithium aluminate of a high crystallinity with a high purity, leading to a high manufacturing cost. Clearly, the particular method is impractical.

SUMMARY OF THE INVENTION

An object of the present invention is to provide a molten carbonate fuel cell of a long life which permits suppressing the outflow of an electrolyte from an electrolyte body so as to suppress the defects accompanying the outflow of the electrolyte such as an increase in the internal resistance and generation of a gas cross-over.

Another object is to provide a method of manufacturing a retaining material for an electrolyte body included in a molten carbonate fuel cell at a low cost, said retaining material being unlikely to give rise to particle growth during use of the electrolyte body including the retaining material over a long period of time.

According to a first aspect of the present invention, there is provided a molten carbonate fuel cell, comprising:

a fuel electrode;

an oxidizing agent electrode; and an electrolyte body prepared by impregnating a porous body including a retaining material and a reinforcing material with an electrolyte containing an alkali carbonate;

wherein the retaining material consists essentially of α-lithium aluminate (α-$LiAlO_2$) having at most 0.60° of a half value width of (104) peak in an X-ray powder diffractometry.

According to a second aspect of the present invention, there is provided a method of manufacturing a retaining material for an electrolyte body included in a molten carbonate fuel cell, comprising the steps of:

putting a lithium aluminate powder containing as a main component α-lithium aluminate powder having a specific surface area of at least 20 m²/g in a molten carbonate heated to 700 to 800° C. so as to achieve particle growth of said α-lithium aluminate powder; and removing said carbonate.

Further, according to a third aspect of the present invention, there is provided a method of manufacturing a retaining material for an electrolyte body included in a molten carbonate fuel cell, comprising the steps of:

forming lithium aluminate by heating a mixture consisting of at least one aluminum compound powder selected from the group consisting of an alumina and an aluminum hydroxide having a specific surface area of at least 100 m²/g and a carbonate mixture containing lithium carbonate; and putting the resultant lithium aluminate in a molten carbonate heated to 700 to 800° C. so as to achieve particle growth of said lithium aluminate powder, and subsequently removing said carbonate.

DETAILED DESCRIPTION OF THE PREFERRED EMBODIMENTS

Figure 1:
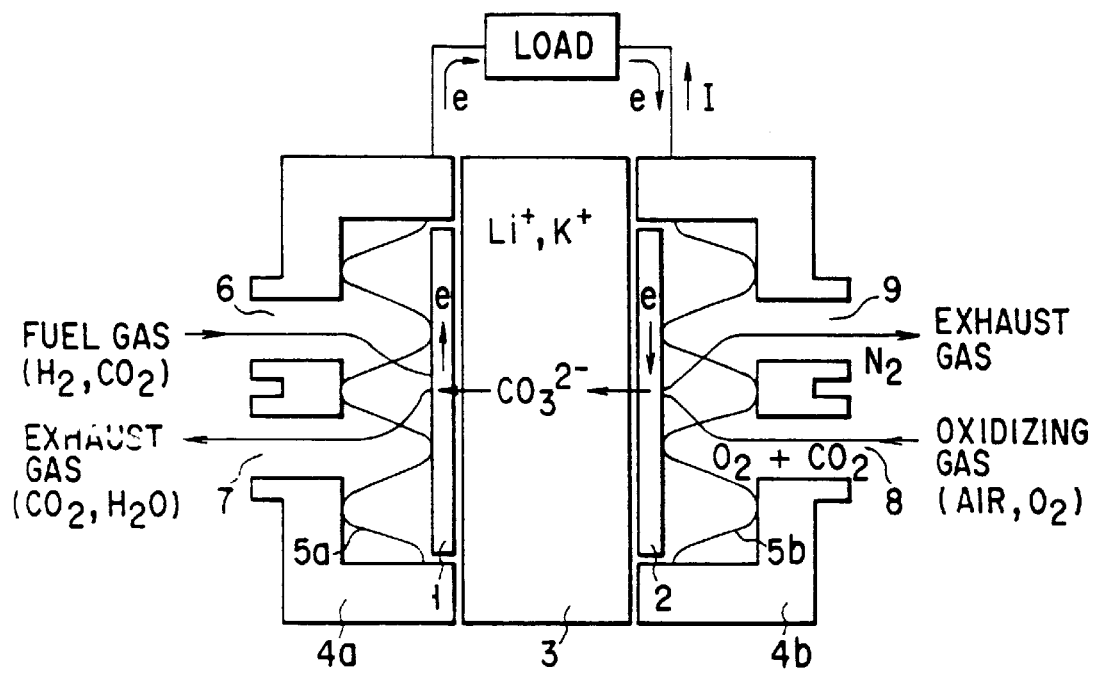
FIG. 1 schematically shows the basic construction of a molten carbonate fuel cell.
Figure 3:
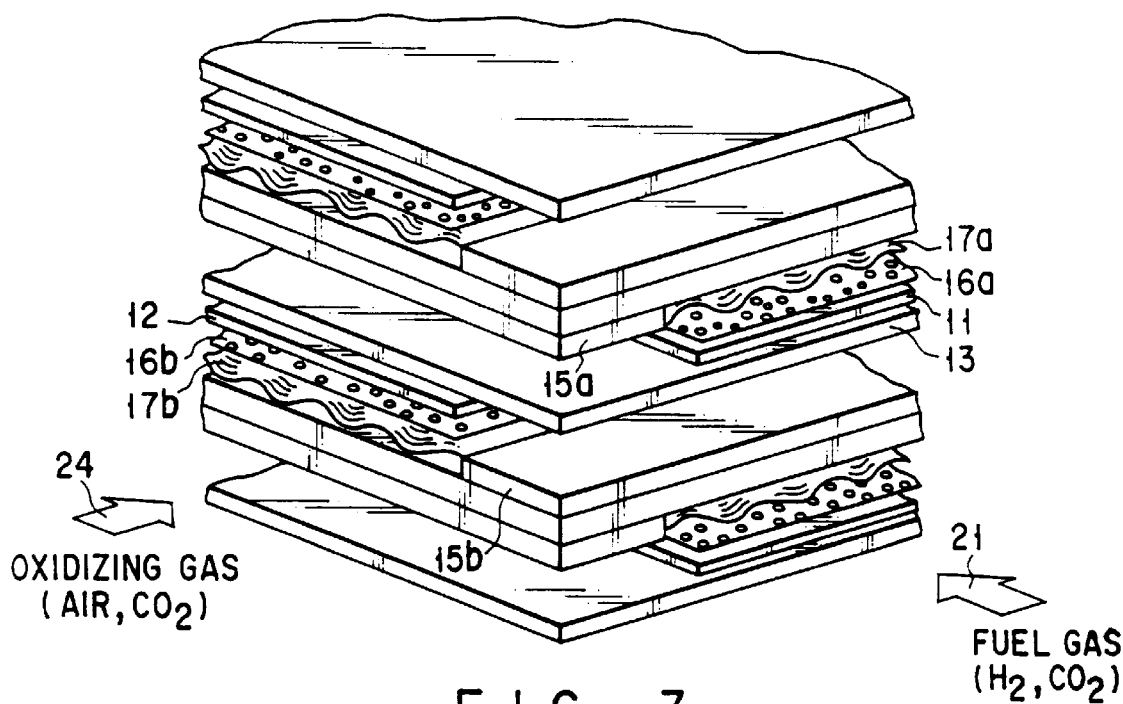
FIG. 3 shows in a magnified fashion a gist portion of the molten carbonate fuel cell shown FIG. 2.
Figure 2:
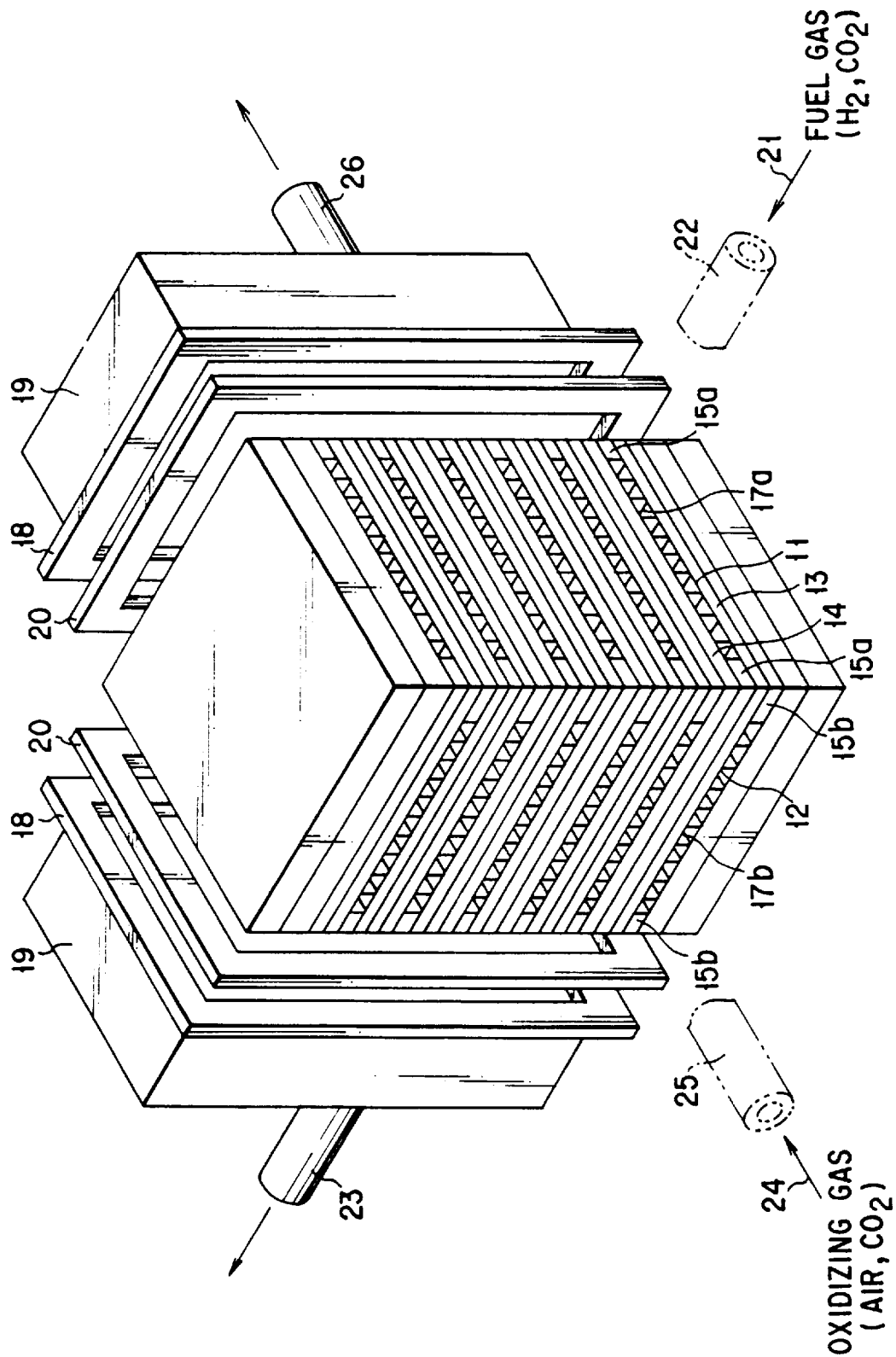
FIG. 2 is an oblique view showing a general construction of a molten carbonate fuel cell according to one embodiment of the present invention.

FIGS. 2 and 3 collectively exemplify a molten carbonate fuel cell of the present invention. As shown in these drawings, the cell comprises an anode (fuel electrode) 11, a cathode (air electrode) 12, and an electrolyte body 13 arranged between these anode 11 and cathode 12 and holding an electrolyte. These anode 11, anode 12 and electrolyte body 13 collectively form a unit cell. Further, a plurality of unit cells are stacked one upon the other with a separator 14 interposed between adjacent unit cells.

The anode 11 arranged on the upper surface of the electrolyte body 13 is sized smaller than the electrolyte body 13 and is positioned in the central portion of the electrolyte body 13 such that one side of the anode 11 is positioned a predetermined distance inward of one side in the same direction of the electrolyte body 13 to provide a free space above the electrolyte body 13. A similar free space is also provided on the opposite side of the anode 11. Further, an edge seal plate 15a is arranged between each of those upper surface regions of the electrolyte body 13 on which the anode 11 is not positioned and the separator 14.

Likewise, the cathode 12 arranged below the lower surface of the electrolyte body 13 is sized smaller than the electrolyte body 13 and is positioned in the central portion of the electrolyte body 13 such that one side of the cathode 12 is positioned a predetermined distance inward of one side in the same direction of the electrolyte body 13 to provide a free space below the electrolyte body 13. It should be noted that the free space provided below the electrolyte body 13 extends in a direction perpendicular to the free space provided above the electrolyte body 13. A similar free space is also provided on the opposite side of the cathode 12. Further, another edge seal plate 15b is arranged between each of those lower surface regions of the electrolyte body 13 below which the cathode 12 is not positioned and the separator 14.

A fuel gas is circulated through a free space defined by the anode 11, the separator 14 and the edge seal plate 15a. As shown in FIG. 3, a laminate structure consisting of a perforated plate 16a and a waved plate 17a each formed of a conductive material and acting as a current collector is arranged in the particular free space such that the perforated plate 16a is in direct contact with the positive electrode 11. Likewise, an oxidizing gas is circulated through a free space defined by the cathode 12, the separator 14 and the edge seal plate 15b. In this case, a laminate structure consisting of a perforated plate 16b and a waved plate 17b each formed of a conductive material and acting as a current collector is arranged in the particular free space such that the perforated plate 16b is in direct contact with the cathode 12.

A manifold 19 having a frame-like flange 18 is arranged on each of four sides of a stacked power generating element consisting of a plurality of unit cells stacked one upon the other with the separator 14 interposed between adjacent unit cells. Also, a manifold seal plate 20 is interposed between the side surface of the stacked power generating element and the flange 18 of the manifold 19. A pipe 22 for supplying a fuel gas 21 is attached to the manifold (not shown) arranged on that side of the stacked power generating element to which the fuel gas-circulating free space is exposed. Also, an exhaust gas discharge pipe 23 is attached to the manifold 19 on the side opposite to the fuel gas supply pipe 22. Further, a pipe 25 for supplying an oxidizing gas 24 is attached to the manifold (not shown) arranged on that side of the stacked power generating element to which the oxidizing gas-circulating free space is exposed. Still further, an exhaust gas discharge pipe 26 is attached to the manifold 19 on the side opposite to the oxidizing gas supply pipe 25.

Each of the anode 11 and the cathode 12 is formed of a porous sintered body of, for example, nickel or a nickel-based alloy. On the other hand, each of the separator 14, the edge seals 15a, 15b, the perforated plates 16a, 16b and the waved plates 17a, 17b is formed of, for example, stainless steel.

The fuel gas 21 consists of a mixture of, for example, a hydrogen gas ($H_2$) and a carbon dioxide gas ($CO_2$). Further, the electrolyte body 13 is prepared by impregnating a porous body consisting of a retaining material (a) and a reinforcing material (b) and having a porosity of 40 to 65% with a molten electrolyte (c) containing alkali carbonates. Let us describe in detail these retaining material (a), reinforcing material (b) and electrolyte (c), as follows:

(c) Electrolyte

The electrolyte used in the present invention includes, for example, a mixture containing any of lithium carbonate, potassium carbonate ($K_2CO_3$), and sodium carbonate ($Na_2CO_3$), a mixture consisting of ($Li_2CO_3$) and ($K_2CO_3$), a mixture consisting of ($Li_2CO_3$) and ($Na_2CO_3$), and a mixture consisting of ($Li_2CO_3$), ($K_2CO_3$), and ($Na_2CO_3$). It is possible to add an alkaline earth metal carbonate to any of the alkali carbonates and to any of the mixtures of the alkali carbonates exemplified above.

(b) Reinforcing material

The reinforcing material serves to prevent an electrolyte body from being cracked by the heat cycle accompanying the starting and stopping of the fuel cell operation. It is possible to use as the reinforcing material γ-lithium aluminate having an average particle diameter of 5 to 50 μm. Particularly, it is desirable to use grains (b-1), short fibers (b-2) and long fibers (b-3) specified below as the reinforcing material:

Granular Reinforcing Material (b-1)

The granular reinforcing material is formed of at least one material selected from the group consisting of α-lithium aluminate, alumina, stabilized zirconia and lithium zirconia and having an average particle diameter of 5 to 50 μm. Compared with γ-lithium aluminate particles, these reinforcing material particles are unlikely to be agglomerated with α-lithium aluminate used as a retaining material, which is described herein later, making it possible to improve the stability of the fine structure of the electrolyte body during operation of the fuel cell.

Short Fiber Reinforcing Member (b-2)

The short fiber reinforcing material is formed of at least one material selected from the group consisting of β-lithium aluminate and γ-lithium aluminate, having an average diameter of 0.5 to 5 μm, and having an average length of at most 50 μm. The difference in curvature radius between the short fiber reinforcing material specified in the present invention and α-lithium aluminate used as a retaining material, which is described herein later, is smaller than that between granular γ-lithium aluminate as a reinforcing material and α-lithium aluminate as a retaining material noted above. As a result, the short fiber reinforcing material is unlikely to absorb the retaining material to form a larger particle, making it possible to improve the stability of the fine structure of the electrolyte body during operation of the fuel cell. To be more specific, the reinforcing material and the retaining material are repeatedly dissolved in the electrolyte and recrystallized during operation of the fuel cell. If the curvature radius of the reinforcing material is larger than that of the retaining material, a difference in the dissolving rate in the electrolyte is brought about between the reinforcing material and the retaining material during operation of the fuel cell. Specifically, the retaining material is dissolved first in the electrolyte and, then, the reinforcing material is dissolved. It should be noted that these dissolved retaining material and reinforcing material are recrystallized on the reinforcing material present within the electrolyte in the form of solid particles. The particular mechanism seemingly produces a phenomenon that the retaining material is dissolved in the electrolyte so as to permit particle growth of the reinforcing material. In other words, the retaining material is seemingly absorbed by and coalesced into the reinforcing material to form fine pores in the electrolyte body, leading to loss of the electrolyte.

The short fiber reinforcing material having an average diameter specified in the present invention permits diminishing the difference from the retaining material in the curvature radius, making it possible to diminish the difference in the dissolving rate in the electrolyte between the retaining material and the reinforcing material during operation of the fuel cell. As a result, the dissolved retaining material and reinforcing material are recrystallized individually. It follows that it is possible to suppress the mutual dissolution and coalescence of the retaining material and reinforcing material, with the result that the stability of the fine structure of the electrolyte body can be improved during operation of the fuel cell.

Long Fiber Reinforcing Material (b-3)

The long fiber reinforcing material is formed of at least one material selected from the group consisting of alumina, lithium aluminate and zirconia, having an average diameter of 1 to 15 μm, and having an average length of 0.1 to 3 mm. At the start-up time of the fuel cell operation, the electrolyte body 13 tends to be cracked because of the difference in the thermal expansion coefficient between the anode 11 fixed to the electrolyte body and the edge seal plate 15a. However, use of the long fiber reinforcing material specified in the present invention permits effectively preventing the cracking of the electrolyte body noted above, compared with use of the γ-lithium aluminate grains.

Further, the reinforcing materials (b-1) to (b-3) noted above can be used in combination for obtaining an electrolyte body which is excellent in stability over a long period of time and which is prevented from the initial cracking at the start-up time of the cell operation and from the crack occurrence caused by heat cycles.

(a) Retaining material

The retaining material consists essentially of α-lithium aluminate (α-LiAlO$_2$) having at most 0.60° of a half value width of (104) peak in an X-ray powder diffractometry. The term "X-ray powder diffractometry" denotes a measurement using a $K_{\alpha 1}$ ray of Cu having a wavelength of 1.54056 Å.

It is desirable for the α-lithium aluminate-based holding member to contain at least 90% by weight, preferably at least 95% by weight, of α-lithium aluminate. If the α-lithium aluminate content of the holding member is less than 90% by weight, the fine structure of the porous body is likely to be changed to form coarse pores. To be more specific, agglomeration and growth of the retaining material grains accompany the change of phase of γ-lithium aluminate constituting the balance of the retaining material into α-lithium aluminate during operation of the molten carbonate fuel cell at, for example, 600 to 700° C. under an atmosphere containing 10 to 30% of $CO_2$, leading to the change in the fine structure of the porous body noted above.

As described above, it is defined in the present invention that the α-lithium aluminate contained in the retaining material should have at most 0.60° of a half value width of (104) peak. Where an electrolyte body is prepared by impregnating a porous body including a retaining material having a half value width exceeding 0.60° with a molten alkali carbonate, the α-lithium aluminate crystals present in the molten salt is rendered unstable during operation of the fuel cell having the electrolyte body incorporated therein. As a result, these crystals tend to be melted and recrystallized, leading to agglomeration or particle growth of the α-lithium aluminate. Alternatively, since the ranges of temperature and $CO_2$ partial pressure within which α-LiAlCO$_2$ is held stable are narrowed, a change of phase into γ-lithium aluminate tends to take place easily. It follows that the fine structure of the porous body is likely to be changed, giving rise to loss of the electrolyte. Preferably, the half value width of (104) peak of α-lithium aluminate should be at most 0.45°.

It is also desirable for the retaining material to be in the form of a powder having an average particle diameter of 0.2 to 0.6 μm. If the average particle diameter of the retaining material is less than 0.2 μm, the retaining material tends to be agglomerated to permit particle growth during operation of the fuel cell provided with an electrolyte body including the particular retaining material. On the other hand, where the average particle diameter of the retaining material exceeds 0.6 μm, the porous body including the retaining material tends to result in failure to hold sufficiently the molten carbonate electrolyte. Preferably, the average particle diameter of the retaining material should fall within a range of between 0.3 μm and 0.5 μm.

The retaining material is prepared as follows:

(1) A lithium aluminate powder containing as a main component α-lithium aluminate powder having a specific surface area of at least 20 $m^2/g$ is put in a molten carbonate heated to 700 to 800° C. so as to achieve particle growth of the α-lithium aluminate powder, followed by removing the carbonate to obtain a retaining material.

It is desirable for the lithium aluminate powder used as the starting material to contain at least 80% by weight, preferably at least 90% by weight, of α-lithium aluminate. If the α-lithium aluminate content of the lithium aluminate powder used as the starting material is lower than 80% by weight, it is difficult to obtain a retaining material containing a sufficiently small amount of lithium aluminate of phases other than α-lithium aluminate. Further, the lithium aluminate powder used as the starting material is required to have a specific surface area of at least 20 $m^2/g$. If the specific surface area is smaller than 20 $m^2/g$, the contact area between the lithium aluminate powder and the molten carbonate is diminished, making it difficult to achieve a sufficient particle growth of the lithium aluminate. Preferably, the specific surface area of the lithium aluminate powder used as the starting material should be at least 30 $m^2/g$.

When the specific surface area of the lithium aluminate is a much too large, a volume of the lithium aluminate is greater so that decreasing a manufacturing efficiency. Therefore, it is a preferable that a lithium aluminate has 50 $g/cm^2$ of the specific surface area as an upper limit.

The carbonate used in the present invention includes, for example, Li/K series eutectic carbonates, Li/Na series eutectic carbonates, Li/K/Na ternary eutectic carbonates, and a mixture of carbonates deviant from the eutectic composition.

The carbonate content of the mixture consisting of the α-lithium aluminate powder and the carbonate should fall within a range of between 5 and 70% by weight. If the carbonate content is lower than 5% by weight, it is difficult to achieve the particle growth satisfactorily. On the other hand, where the carbonate content exceeds 70% by weight, the productivity of the retaining material tends to be lowered. Preferably, the carbonate content in question should fall within a range of between 10 and 50% by weight.

It is important to define the temperature at which the particle growth of lithium aluminate is performed. If the temperature is lower than 700° C., it is difficult to achieve promptly the particle growth of α-lithium aluminate having a large specific surface area. On the other hand, where the temperature in the particle growing step exceeds 800° C., the α-lithium aluminate tends to be converted partly into γ-lithium aluminate, with the result that the lithium aluminate particles are likely to grow excessively. Preferably, the temperature in the particle growing step should fall within a range of between 730° C. and 780° C.

It is desirable to carry out the particle growing step of the lithium aluminate powder under a carbon dioxide-containing atmosphere. Where the particle growing step is carried out under a carbon dioxide-containing atmosphere, it is possible to suppress conversion of lithium aluminate into γ-lithium aluminate in the process of the particle growth. Specifically, the carbon dioxide concentration in the atmosphere should be at least 1%, preferably at least 10%.

The heat treatment under the carbon dioxide-containing atmosphere should be carried out for 10 to 100 hours. It should be noted that the particle growth of α-lithium aluminate contained in the starting material lithium aluminate powder can be achieved with a higher stability with increase in the carbon dioxide concentration in the atmosphere in the particle growing step of the lithium aluminate powder.

After the particle growing step, the mixture consisting of the carbonate and lithium aluminate is cooled to room temperature, followed by removing the carbonate by using a solvent. The solvent used in this step includes, for example, water and acid solution such as acetic acid. In addition, it is possible to use an acid and an aqueous solution of an organic acid which permits dissolving the carbonate and is incapable of dissolving lithium aluminate.

As described above, a lithium aluminate powder containing as a main component α-lithium aluminate having a large specific surface area, which is used as a starting material, is subjected to particle growth within a molten carbonate in the present invention. The particular method permits manufacturing in a short time a retaining material containing α-lithium aluminate particles having a high crystallinity and a high purity. The resultant retaining material is used together with the reinforcing material described previously to prepare a porous body, followed by impregnating the porous body with an electrolyte containing an alkali carbonate so as to obtain an electrolyte body. Further, the electrolyte body thus obtained is incorporated in a molten carbonate fuel cell. In the resultant fuel cell, the agglomeration and particle growth of the retaining material particles contained in the electrolyte body can be suppressed, making it possible to suppress the loss of the electrolyte.

(2) A mixture consisting of at least one aluminum compound powder selected from the group consisting of an alumina and an aluminum hydroxide having a specific surface area of at least 100 $m^2/g$ and a carbonate including lithium carbonate is subjected to a heat treatment to form lithium aluminate. Then, the resultant lithium aluminate is subjected to particle growth within a molten carbonate, followed by removing the carbonate so as to manufacture a retaining material.

Where the aluminum compound powder has a specific surface area of at least 100 $m^2/g$, lithium aluminate can be formed in a short time. In addition, the reaction to form lithium aluminate can be performed uniformly.

It is desirable to apply the heat treatment to the mixture consisting of the aluminum compound powder and the carbonate at 550 to 700° C. for 10 to 100 hours under an atmosphere containing 1 to 100% of carbon dioxide. Where the heat treatment is performed at 550 to 700° C. under an atmosphere containing at least 1% of carbon dioxide gas, it is possible to obtain an α-lithium aluminate powder of a high purity, which is low in its γ-phase content. Preferably, the temperature of the heat treatment should fall within a range of between 580° C. and 620° C.

The carbonate including lithium carbonate noted above includes, for example, lithium carbonate ($LiCO_3$), a mixture of lithium carbonate and Li/K series binary eutectic carbonate, a mixture of lithium carbonate and Li/Na series binary eutectic carbonate, a mixture of lithium carbonate and Li/K/Na series ternary eutectic carbonate, and a mixture of carbonates deviant from the eutectic composition.

The mixing molar ratio of the aluminum compound powder to lithium carbonate (aluminum compound:lithium carbonate) should fall within a range of between 1:1 and 1:3.

Also, it is possible to mix an aluminum compound powder with lithium hydroxide, followed by subjecting the resultant mixture to a heat treatment under a $CO_2$-containing atmosphere. In this case, the same effect can be obtained because lithium carbonate is formed by the reaction between lithium hydroxide and the carbon dioxide gas.

The carbonate content of the mixture consisting of the lithium aluminate powder containing α-lithium aluminate as a main component and the carbonate should fall within a range of between 5 and 70% by weight because of the reasons described previously in conjunction with the method of item (1).

The temperature in the particle growing step should be 700 to 800° C. because of the reasons described previously in conjunction with the method of item (1). Also, the particle growing step should be carried out under a carbon dioxide-containing atmosphere because of the reasons described previously in conjunction with the method of item (1). Incidentally, the concentration of carbon dioxide gas in the atmosphere should be at least 1%, preferably at least 10%.

After the particle growing step, the mixture of the carbonate and lithium aluminate should be cooled to room temperature, followed by removing the carbonate by using the solvent described previously in conjunction with the method of item (1).

As described above, a lithium aluminate containing as a main component α-lithium aluminate is formed by using at least one aluminum compound powder selected from the group consisting of an alumina and a aluminum hydroxide having a large specific surface area and, then, is subjected to particle growth within a molten carbonate in the present invention. The particular method permits manufacturing in a short time a retaining material containing α-lithium aluminate particles having a high crystallinity and a high purity, as in the method of item (1). The resultant retaining material is used together with the reinforcing material described previously to prepare a porous body, followed by impregnating the porous body with an electrolyte containing an alkali carbonate so as to obtain an electrolyte body. Further, the electrolyte body thus obtained is incorporated in a molten carbonate fuel cell. In the resultant fuel cell, the agglomeration and particle growth of the retaining material particles contained in the electrolyte body can be suppressed, making it possible to suppress the loss of the electrolyte.

The electrolyte body can be prepared by the methods exemplified below:

(1) In the first step, the retaining material, the reinforcing material and an organic binder are mixed in the presence of an organic solvent. The organic binder used in the present invention includes, for example, polyvinyl butyral, dibutyl phthalate and acrylic resin. Also, the organic solvent used in the present invention includes, for example, toluene, xylene and methyl ethyl ketone. The resultant mixture is then formed into a green sheet by an ordinary sheet-forming method such as a doctor blade method, a calendar roll method, a slip casting method or a cold extrusion method, followed by defeating the green sheet to obtain a porous body having a predetermined porosity. On the other hand, an electrolyte consisting of a mixture of alkali carbonates is formed into a sheet, as in preparation of the porous body described above, followed by superposing the sheet-like electrolyte on the porous body. Under this condition, the electrolyte is melted to permit the porous body to be impregnated with the electrolyte, thereby manufacturing an electrolyte body.

(2) The porous body prepared by the method of item (1) above is arranged between an anode impregnated in advance with an electrolyte consisting of a mixture of alkali carbonates and a cathode not impregnated with an electrolyte to form a unit cell constructed as shown in FIG. 2. Then, a plurality of unit cells are stacked one upon the other with a separator interposed between adjacent unit cells so as to prepare a stacked power generating element, followed by attaching a manifold to each of the four side surfaces of the resultant power generating element so as to obtain a fuel cell. Further, the resultant fuel cell is heated to an operating temperature so as to permit the molten mixture of alkali carbonates impregnated in the anode to be diffused into the pores of the porous body and, thus, to obtain a desired electrolyte body.

As described above in detail, the molten carbonate fuel cell of the present invention comprises an electrolyte body prepared by impregnating a porous body including a retaining material and a reinforcing material with an electrolyte containing an alkali carbonate, the retaining material being based on α-lithium aluminate having at most 0.60° of a half value width of (104) peak in an X-ray powder diffractometry. The particular fuel cell is operated at, for example, 600 to 700° C. under an atmosphere containing 10 to 30% of carbon dioxide gas. Since the retaining material in the molten carbonate contains as a main component α-lithium aluminate having a predetermined half value width of (104) peak in an X-ray powder diffractometry, a phase transformation of the retaining material does not take place within the molten carbonate to allow the retaining material to be present with a high stability during the operation of the fuel cell over a long period of time. As a result, it is possible to suppress agglomeration and particle growth of the retaining material particles within the electrolyte body, making it possible to prevent the fine structure of the porous body (matrix) from being changed. It follows that the flow-out of the electrolyte from the electrolyte body is lowered so as to suppress the problems accompanying the flow-out of the electrolyte such as an increased internal resistance of the fuel cell and occurrence of the gas cross-over. Naturally, the molten carbonate fuel cell of the present invention exhibits a long life.

Let us describe in the following preferred Examples of the present invention.

EXAMPLE 1

A lithium aluminate powder available on the market, said powder having a specific surface area of 40 $m^2/g$ and containing 98% by weight of α-lithium aluminate, was mixed with a eutectic mixture consisting of 62 mol % of $Li_2CO_3$ and 38 mol % of $K_2CO_3$. The mixing ratio by weight of the lithium aluminate powder to the carbonate mixture was 1:1. The resultant mixture was subjected to a heat treatment at 750° C. for 50 hours under a carbon dioxide gas atmosphere, followed by cooling to room temperature. Then, the carbonates were removed by using acetic acid so as to obtain a powder (retaining material).

The resultant powder was subjected to an X-ray powder diffractometry, with the result that the powder was found to contain 95% by weight of α-lithium aluminate. Also, the average particle diameter of the powder, which was determined by an image analysis, was found to be about 0.4 µm. Further, the powder was found to have 0.36° of a half value width of (104) peak in an X-ray powder diffractometry.

Figure 4:
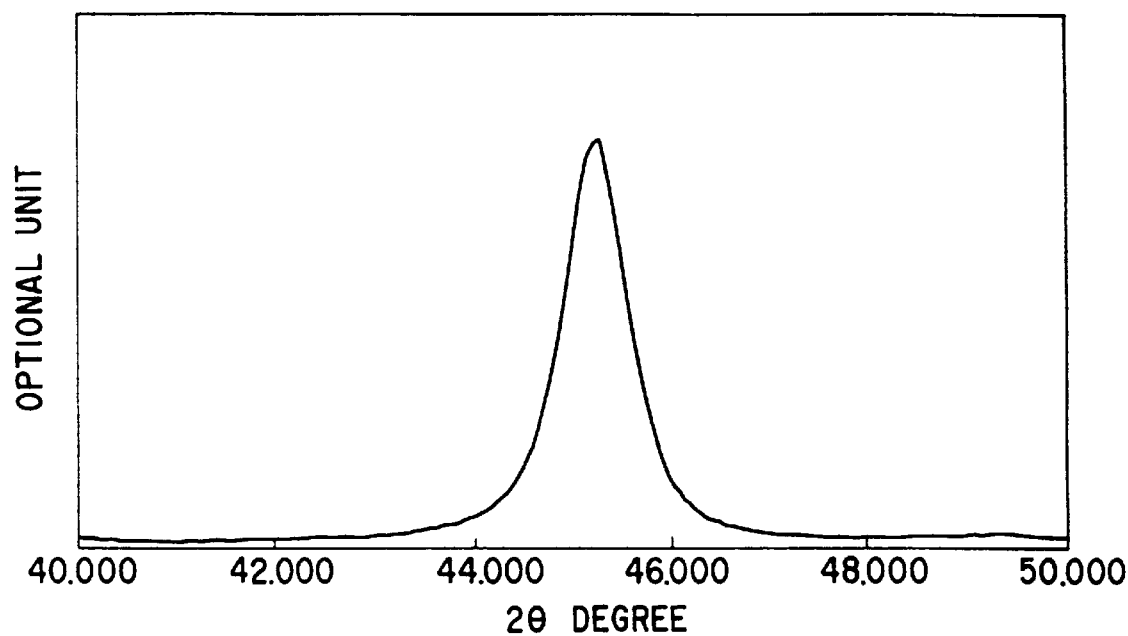
FIG. 4 is an X-ray powder diffraction pattern of αlithium aluminate before treatment in Example 1.
Figure 5:
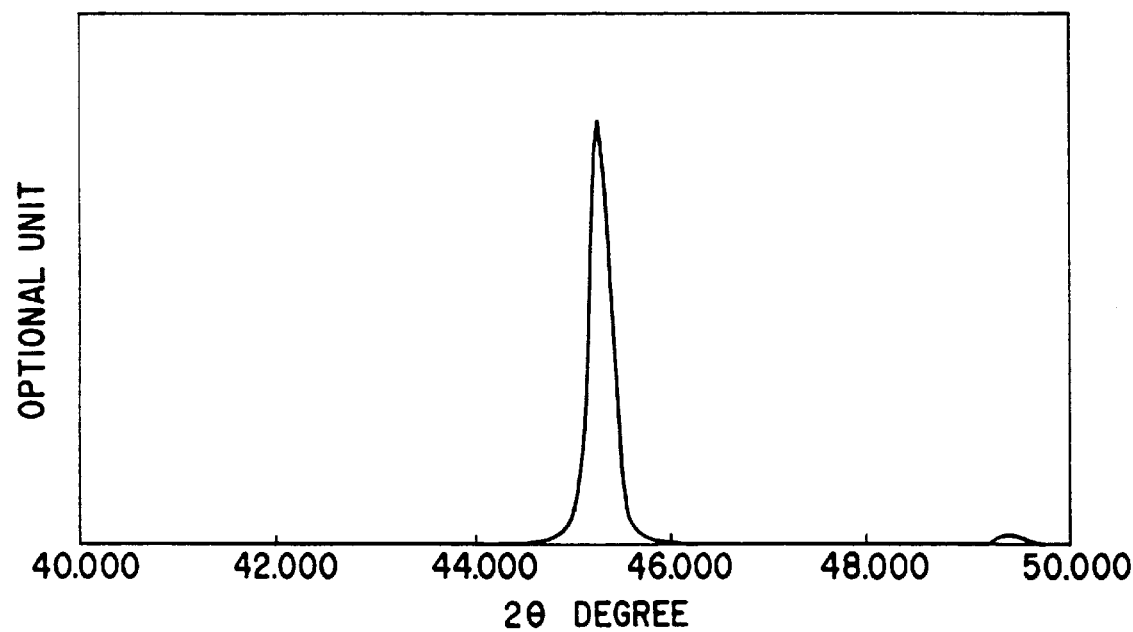
FIG. 5 is an X-ray powder diffraction pattern of α-lithium aluminate separated from the powder obtained in Example 1.

FIG. 4 shows an X-ray diffraction pattern of the α-lithium aluminate powder used as the starting material, with FIG. 5 showing an X-ray diffraction pattern of the α-lithium aluminate powder obtained after the treatment. As apparent from comparison between FIGS. 4 and 5, the α-lithium aluminate powder after the treatment exhibits a half value width of (104) peak in an X-ray powder diffractometry, which is markedly narrower than that of the α-lithium aluminate powder before the treatment.

EXAMPLE 2

An α-lithium aluminate powder having a specific surface area of 23 $m^2/g$ was mixed with the eutectic mixture of carbonates equal to that used in Example 1 in a mixing ratio by weight of 1:1. The mixing was performed in acetone. After removal of acetone, the resultant mixture was subjected to a heat treatment at 750° C. for 50 hours under a carbon dioxide gas atmosphere, followed by cooling to room temperature. Further, the carbonates contained in the mixture were removed by using acetic acid so as to obtain a powder (retaining material).

The resultant powder was subjected to an X-ray powder diffractometry, with the result that the powder was found to consist of 100% of α-lithium aluminate. Also, the average particle diameter of the powder, which was determined by an image analysis, was found to be about 0.6 μm. Further, the powder was found to have 0.48° of a half value width of (104) peak in an X-ray powder diffractometry.

EXAMPLE 3

An α-lithium aluminate powder having a specific surface area of 33 $m^2/g$ was mixed with the eutectic mixture of carbonates equal to that used in Example 1 in a mixing ratio by weight of 1:1. The mixing was performed in acetone. After removal of acetone, the resultant mixture was subjected to a heat treatment at 750° C. for 50 hours under a carbon dioxide gas atmosphere, followed by cooling to room temperature. Further, the carbonates contained in the mixture were removed by using acetic acid so as to obtain a powder (retaining material).

The resultant powder was subjected to an X-ray powder diffractometry, with the result that the powder was found to consist of 100% of α-lithium aluminate. Also, the average particle diameter of the powder, which was determined by an image analysis, was found to be about 0.4 μm. Further, the powder was found to have 0.39° of a half value width of (104) peak in an X-ray powder diffractometry.

EXAMPLE 4

An α-lithium aluminate powder having a specific surface area of 40 $m^2/g$ was mixed with the eutectic mixture of carbonates equal to that used in Example 1 in a mixing ratio by weight of 1:1. The mixing was performed in acetone. After removal of acetone, the resultant mixture was subjected to a heat treatment at 750° C. for 50 hours under a carbon dioxide gas atmosphere, followed by cooling to room temperature. Further, the carbonates contained in the mixture were removed by using acetic acid so as to obtain a powder (retaining material).

The resultant powder was subjected to an X-ray powder diffractometry, with the result that the powder was found to consist of 100% of α-lithium aluminate. Also, the average particle diameter of the powder, which was determined by an image analysis, was found to be about 0.4 μm. Further, the powder was found to have 0.36° of a half value width of (104) peak in an X-ray powder diffractometry.

Comparative Example 1

An α-lithium aluminate powder having a specific surface area of 17 $m^2/g$ was mixed with the eutectic mixture of carbonates equal to that used in Example 1 in a mixing ratio by weight of 1:1. The mixing was performed in acetone. After removal of acetone, the resultant mixture was subjected to a heat treatment at 750° C. for 50 hours under a carbon dioxide gas atmosphere, followed by cooling to room temperature. Further, the carbonates contained in the mixture were removed by using acetic acid so as to obtain a powder (retaining material).

The resultant powder was subjected to an X-ray powder diffractometry, with the result that the powder was found to contain 3% by weight of α-lithium aluminate.

Comparative Example 2

A lithium aluminate powder having a specific surface area of 20 $m^2/g$ and consisting of 85% by weight of γ-lithium aluminate and 15% by weight of α-lithium aluminate was mixed with the eutectic mixture of carbonates equal to that used in Example 1 in a mixing ratio by weight of 1:1. The mixing was performed in acetone. After removal of acetone, the resultant mixture was subjected to a heat treatment at 750° C. for 50 hours under a carbon dioxide gas atmosphere, followed by cooling to room temperature. Further, the carbonates contained in the mixture were removed by using acetic acid so as to obtain a powder (retaining material).

The resultant powder was subjected to an X-ray powder diffractometry, with the result that the powder was found to contain 20% by weight of α-lithium aluminate.

Comparative Example 3

A γ-lithium aluminate powder having a specific surface area of 20 $m^2/g$ was mixed with the eutectic mixture of carbonates equal to that used in Example 1 in a mixing ratio by weight of 1:1. The mixing was performed in acetone. After removal of acetone, the resultant mixture was subjected to a heat treatment at 750° C. for 50 hours under a carbon dioxide gas atmosphere, followed by cooling to room temperature. Further, the carbonates contained in the mixture were removed by using acetic acid so as to obtain a powder (retaining material).

The resultant powder was subjected to an X-ray powder diffractometry, with the result that the powder was found not to contain at all α-lithium aluminate and to consist of γ-phase alone.

The retaining material obtained in each of Examples 1 to 4 and Comparative Examples 1 to 3 was put in an alumina pot together with a reinforcing material consisting of γ-$LiAlO_2$ particles having an average particle diameter of 15 μm. The volume ratio of the retaining material to the reinforcing material was 70:30. Toluene, polyvinyl butyral and dibutyl phthalate were also put in the pot to perform a wet mixing of the retaining material and the reinforcing material for 20 hours so as to obtain a slurry, followed by spreading the slurry on a carrier sheet to form a matrix green sheet having a thickness of 0.5 mm. Then, the matrix green sheet was defeated under the air atmosphere so as to obtain a porous body.

On the other hand, an electrolyte sheet was prepared as in preparation of the porous body by using a mixture of alkali carbonates consisting of 62 mol % of $Li_2CO_3$ and 38 mol % of $K_2CO_3$. The electrolyte sheet was superposed on the porous body and, then, melted by heating to 550° C. so as to permit the porous body to be impregnated with the molten electrolyte consisting of the mixture of the alkali carbonates, thereby obtaining an electrolyte body having a thickness of 0.5 mm.

A molten carbonate fuel cell constructed as shown in FIGS. 2 and 3 was assembled by using the resultant electrolyte body, an anode, a cathode, a separator, an edge seal plate, a perforated plate and a waved plate. Each of the anode and the cathode was formed of a nickel-based alloy. On the other hand, each of the separator, edge seal plate, perforated plate and waved plate was formed of a stainless steel.

The resultant fuel cell was subjected to a power generating test for 2000 hours under a load of 150 mA/cm² at 700° C. During the test, a fuel gas consisting of 80% by volume of $H_2$ and 20% by volume of $CO_2$, which was humidified to allow the fuel gas to contain 1 atm. of water vapor, was supplied to the anode of the fuel cell under a pressure of 5 atm. Likewise, an oxidizing gas consisting of 70% by volume of air and 30% by volume of $CO_2$ was supplied to the cathode of the fuel cell under a pressure of 5 atm. Table 1 shows the operating voltage drop of the fuel cell after the power generating test, together with the half value width of (104) peak of $\alpha$-$LiAlO_2$ in an X-ray powder diffractometry with respect to the retaining material in each of Examples 1 to 4 and Comparative Examples 1 to 3.

TABLE 1

|  | Starting Material Powder | | Manufactured Powder | | |
| --- | --- | --- | --- | --- | --- |
|  | Kind | Specific Surface Area (m²/g) | α-phase Content (%) | Half value width (°) | Cell Characteristics Operatin Voltage Drop (mv) |
| Example 1 | α-LiAlO₂ | 40 | 95 | 0.36 | 93 |
| Example 2 | α-LiAlO₂ | 23 | 190 | 0.48 | 129 |
| Example 3 | α-LiAlO₂ | 33 | 100 | 0.39 | 60 |
| Example 4 | α-LiAlO₂ | 40 | 100 | 0.36 | 53 |
| Comparative Example 1 | α-LiAlO₂ | 17 | 3 | — | 392 |
| Comparative Example 2 | γ-LiAlO₂ | 20 | 20 | — | 253 |
| Comparative Example 3 | γ-LiAlO₂ | 20 | 0 | — | 294 |

The retaining material used in any of Examples 1 to 4 contained as a main component, i.e., 95 to 100% by weight, $\alpha$-$LiAlO_2$ having at most 0.60° of half value width of (104) peak in an X-ray powder diffractometry. In this case, the operating voltage drop after operation of the fuel cell under a pressurized condition for 2000 hours was as small as only 130 mV or less, as apparent from Table 1, supporting that the fuel cell of the present invention permits maintaining a good cell performance. Particularly, where the half value width noted above was not larger than 0.45° as in Examples 1, 3 and 4, the operating voltage drop of the fuel cell was as small as 93 mV or less, supporting a more prominent cell performance.

On the other hand, $\alpha$-lithium aluminate failed to form a main component of the retaining material in each of Comparative Examples 1 to 3. In this case, the operating voltage drop after operation of the fuel cell for 2000 hours under a pressurized condition was as large as 253 to 392 mV.

Examples 5–12 and Comparative Examples 4–6

An $\alpha$-lithium aluminate powder having a specific surface area of 40 m²/g was mixed with the eutectic mixture of carbonates equal to that used in Example 1 in a mixing ratio by weight of 1:1. The mixing was performed in acetone. After removal of acetone, the resultant mixtures were respectively subjected to a heat treatment under conditions (atmosphere, temperature, heating time) shown in Table 2. After the heat treatment, the mixture was cooled to room temperature, followed by removing the carbonates by using acetic acid so as to obtain a powder (retaining materials).

Table 2 also shows the $\alpha$-lithium aluminate content of the powder (retaining material), the half value width of (104) peak of $\alpha$-lithium aluminate in an X-ray powder diffractometry, and an average particle diameter of the powder. Incidentally, the half value width noted above was measured in respect of only the cases where the powder (retaining material) contained $\alpha$-lithium aluminate as a main component.

An electrolyte body was prepared as in Example 1 by using the retaining material for each of Examples 5–12 and Comparative Examples 4–6. Further, a molten carbonate fuel cell constructed as shown in FIGS. 2 and 3 was assembled by using the electrolyte body thus prepared. The resultant fuel cell was subjected to a power generating test for 2000 hours under a load of 150 mA/cm² at 700° C. as in Example 1 so as to measure the operating voltage drop after the test. Table 2 also shows the result. Incidentally, it was impossible to take out a load current of 150 mA/cm² from the fuel cell using the retaining material for each of Comparative Examples 5 and 6.

TABLE 2

|  | Heat Treatment | | | Manufactured Powder | | | Cell Characteristics |
| --- | --- | --- | --- | --- | --- | --- | --- |
|  | Temperature (° C.) | CO₂ Concentration (%) | Time (H) | α-phase Content (%) | Half Value Width (°) | Average Grain Diameter (μm) | Operating Voltage Drop (mV) |
| Example 5 | 700 | 100 | 50 | 100 | 0.56 | 0.2 | 103 |
| Example 6 | 730 | 100 | 50 | 100 | 0.44 | 0.3 | 63 |
| Example 7 | 780 | 100 | 50 | 100 | 0.33 | 0.5 | 67 |
| Example 8 | 8Q0 | 100 | 50 | 97 | 0.31 | 0.6 | 115 |
| Example 9 | 750 | 1 | 50 | 95 | 0.34 | 0.6 | 124 |
| Example 10 | 750 | 5 | 50 | 98 | 0.35 | 0.6 | 127 |
| Example 11 | 750 | 10 | 50 | 100 | 0.36 | 0.4 | 55 |
| Example 12 | 750 | 100 | 10 | 100 | 0.59 | 0.2 | 106 |
| Comparative Example 4 | 650 | 100 | 50 | 100 | 0.87 | 0.06 | 272 |
| Comparative Example 5 | 850 | 100 | 50 | 6 | — | 1.5 | — |
| Comparative Example 6 | 900 | 100 | 50 | 0 | — | 1.6 | — |

As indicated in Table 2, the heat treatment in the particle growing step of the starting material powder of $\alpha$-lithium aluminate was performed at 700 to 800° C. in each of Examples 5 to 12 of the present invention to obtain the powder (retaining material). In each of these Examples, obtained was a α-lithium aluminate powder having less than 0.60° of a half value width of (104) peak. Particularly, in each of Examples 6, 7 and 11 in which the heat treatment was performed at 730 to 780° C. under an atmosphere containing at least 10% of carbon dioxide gas, obtained was an ideal powder consisting of 100% of α-lithium aluminate having less than 0.45° of a half value width of (104) peak in an X-ray powder diffractometry.

On the other hand, the powder obtained in Comparative Example 4, in which the heat treatment was performed at temperature lower than 700° C., was found to have a large half value width and poor in crystallinity. Further, the powder obtained in each of Comparative Examples 5 and 6, in which the heat treatment was performed at temperature higher than 800° C., was found to be low in its α-lithium aluminate content.

It is also seen from Table 2 that the fuel cell prepared by using the retaining material consisting of α-lithium aluminate having less than 0.60° of a half value width of (104) peak in an X-ray powder diffractometry (Examples 5–12) was found to exhibit such a small operating voltage drop as less than 130 mV after operation for 2000 hours under a pressurized condition, supporting that the fuel cell specified in the present invention permits maintaining a satisfactory cell performance. On the other hand, the fuel cell prepared by using the retaining material consisting of α-lithium aluminate having more than 0.60° of a half value width of (104) peak in an X-ray powder diffractometry (Comparative Examples 4) was found to exhibit such a large operating voltage drop as 272 mV after operation for 2000 hours under a pressurized condition.

EXAMPLE 13

Starting materials consisting of a high purity alumina powder having a specific surface area of 100 m$^2$/g, a eutectic mixture of carbonates consisting of 62 mol % of $Li_2CO_3$ and 38 mol % of $K_2CO_3$, and lithium carbonate were subjected to a wet mixing within acetone. The mixing ratio by weight was 2 (alumina powder): 5 (eutectic mixture): 3 (lithium carbonate), the molar ratio being 2:5:4. After the mixing step, acetone was removed, followed by subjecting the resultant mixture to a first heat treatment at 600° C. for 50 hours and, then, to a second heat treatment at 700° C. for 50 hours. These heat treatments were performed under a carbon dioxide gas atmosphere. After these heat treatments, the mixture was cooled to room temperature, followed by removing the carbonates by using acetic acid to obtain a powder (retaining material).

EXAMPLE 14

Starting materials consisting of a high purity alumina powder having a specific surface area of 100 m$^2$/g, a eutectic mixture of carbonates equal to that used in Example 13, and lithium carbonate were subjected to a wet mixing within acetone. The mixing ratio by weight was 2 (alumina powder): 5 (eutectic mixture): 3 (lithium carbonate). After the mixing step, acetone was removed, followed by subjecting the resultant mixture to a first heat treatment at 600° C. for 50 hours and, then, to a second heat treatment at 750° C. for 50 hours. These heat treatments were performed under a carbon dioxide gas atmosphere. After these heat treatments, the mixture was cooled to room temperature, followed by removing the carbonates by using acetic acid to obtain a powder (retaining material).

EXAMPLE 15

Starting materials consisting of a high purity alumina powder having a specific surface area of 100 m$^2$/g, a eutectic mixture of carbonates equal to that used in Example 13, and lithium carbonate were subjected to a wet mixing within acetone. The mixing ratio by weight was 2 (alumina powder): 5 (eutectic mixture): 3 (lithium carbonate). After the mixing step, acetone was removed, followed by subjecting the resultant mixture to a first heat treatment at 600° C. for 50 hours and, then, to a second heat treatment at 800° C. for 50 hours. These heat treatments were performed under a carbon dioxide gas atmosphere. After these heat treatments, the mixture was cooled to room temperature, followed by removing the carbonates by using acetic acid to obtain a powder (retaining material).

Comparative Example 7

Starting materials consisting of a high purity alumina powder having a specific surface area of 80 m$^2$/g, a eutectic mixture of carbonates equal to that used in Example 13, and lithium carbonate were subjected to a wet mixing within acetone. The mixing ratio by weight was 2 (alumina powder): 5 (eutectic mixture): 3 (lithium carbonate). After the mixing step, acetone was removed, followed by subjecting the resultant mixture to a first heat treatment at 600° C. for 50 hours and, then, to a second heat treatment at 700° C. for 50 hours. These heat treatments were performed under a carbon dioxide gas atmosphere. After these heat treatments, the mixture was cooled to room temperature, followed by removing the carbonates by using acetic acid to obtain a powder (retaining material).

Comparative Example 8

Starting materials consisting of a high purity alumina powder having a specific surface area of 100 m$^2$/g, a eutectic mixture of carbonates equal to that used in Example 13, and lithium carbonate were subjected to a wet mixing within acetone. The mixing ratio by weight was 2 (alumina powder): 5 (eutectic mixture): 3 (lithium carbonate). After the mixing step, acetone was removed, followed by subjecting the resultant mixture to a first heat treatment at 600° C. for 50 hours and, then, to a second heat treatment at 850° C. for 50 hours. These heat treatments were performed under a carbon dioxide gas atmosphere. After these heat treatments, the mixture was cooled to room temperature, followed by removing the carbonates by using acetic acid to obtain a powder (retaining material).

Comparative Examples 9 and 10

Starting materials consisting of a high purity alumina powder having a specific surface area of 100 m$^2$/g, a eutectic mixture of carbonates equal to that used in Example 13, and lithium carbonate were subjected to a wet mixing within acetone. The mixing ratio by weight was 2 (alumina powder): 5 (eutectic mixture): 3 (lithium carbonate). After the mixing step, acetone was removed, followed by subjecting the resultant mixture to a heat treatment for 50 hours at temperatures shown in Table 3 under a carbon dioxide gas atmosphere. After the heat treatment, the mixture was cooled to room temperature, followed by removing the carbonates by using acetic acid to obtain a powder (retaining material).

Table 3 also shows the α-lithium aluminate content, half value width of (104) peak in an X-ray powder diffractometry, and average grain diameter in respect of each of the powder (retaining material) obtained in each of Examples 13–15 and Comparative Examples 7–10. As indicated in Table 3, the α-lithium aluminate content of the powder obtained in Comparative Example 8 was as low as only 5%. In other words, α-lithium aluminate failed to constitute a main component of the powder. Therefore, the half value width of (104) peak of α-lithium aluminate was not measured for the powder obtained in Comparative Example 8.

An electrolyte body was prepared as in Example 1 by using the retaining material obtained in each of Examples 13–15 and Comparative Examples 7–10. Further, a molten carbonate fuel cell constructed as shown in FIGS. 2 and 3 was assembled by using each of the electrolyte bodies thus prepared. Each of these fuel cells was subjected to a power generating test for 2000 hours under a load of 150 mA/cm$^2$ at 700° C., as in Example 1 so as to measure the operating voltage drop of the fuel cell after the test. The test result is also shown in Table 3.

TABLE 3

| | Starting Material Powder | Manufactured Powder | | | |
|---|---|---|---|---|---|
| | Specific Surface Area (m$^2$/g) | Heat Treatment Temperature (° C.) | α-phase Content | Half value Width (°) | Average Grain Diameter (μm) | Cell Characteristics Operating Voltage Drop (mV) |
| Example 13 | 100 | 600→700 | 100 | 0.55 | 0.2 | 101 |
| Example 14 | 100 | 600→750 | 100 | 0.39 | 0.3 | 62 |
| Example 15 | 100 | 600→800 | 100 | 0.33 | 0.5 | 70 |
| Comparative Example 7 | 80 | 600→700 | 80 | 0.66 | 0.9 | 294 |
| Comparative Example 8 | 100 | 600→850 | 5 | — | 1.2 | 380 |
| Comparative Example 9 | 100 | 600 | 100 | 0.93 | 0.04 | 302 |
| Comparative Example 10 | 100 | 650 | 88 | 0.75 | 0.1 | 253 |

As indicated in Table 3, an alumina powder having a specific surface area of 100 m$^2$/g was used as a starting material in each of Examples 13 to 15. Also, the heat treatment was performed in two stages, i.e., at 600° C. in the first stage and at 700 to 800° C. in the second stage. As a result, obtained was an α-lithium aluminate powder having less than 0.60° of a half value width of (104) peak in an X-ray powder diffractometry, leading to a satisfactory cell performance after the test for operation under a pressurized condition, as apparent from Table 3.

On the other hand, an alumina powder having a specific surface area smaller than 100 m$^2$/g was used a starting material in Comparative Example 7. In this case, the resultant powder (retaining material) exhibited a large half value width and was found to be poor in crystallinity. In Comparative Example 8, the heat treatment was performed at a temperature higher than 800° C. In this case, the resultant powder (retaining material) was found to be low in its α-lithium aluminate content. Further, a single stage heat treatment was employed in each of Comparative Examples 9 and 10. In this case, the resultant powder (retaining material) was found to exhibit a large half value width and to be poor in crystallinity.

It should also be noted that the fuel cell prepared by using the retaining material consisting of α-lithium aluminate having less than 0.60° of a half value width of (104) peak in an X-ray powder diffractometry exhibited such a small operating voltage drop as less than 130 mV after operation under a pressurized condition for 2000 hours (Examples 13–15). On the other hand, the fuel cell prepared by using the retaining material, which was low in its α-lithium aluminate content or which exhibited more than 0.60° of a half value width of (104) peak in an X-ray powder diffractometry, exhibited such a large operating voltage drop as 253 mV or more after operation under a pressurized condition for 2000 hours (Comparative Examples 7–10).

EXAMPLE 16

Starting materials consisting of a high purity aluminum hydroxide powder having a specific surface area of 100 m$^2$/g, a eutectic mixture of carbonates equal to that used in Example 13, and lithium carbonate were subjected to a wet mixing within acetone. The mixing ratio by weight was 6 (aluminum hydroxide powder): 5 (eutectic mixture): 3 (lithium carbonate). After the mixing step, acetone was removed, followed by subjecting the resultant mixture to a first heat treatment at 600° C. for 50 hours and, then, to a second heat treatment at 750° C. for 50 hours. These heat treatment were performed under a carbon dioxide gas atmosphere. After these heat treatments, the mixture was cooled to room temperature, followed by removing the carbonates by using acetic acid to obtain a powder (retaining material).

The resultant powder was subjected to an X-ray powder diffractometry, with the result that the powder was found to consist of 100% of α-lithium aluminate. Also, the average particle diameter of the powder, which was determined by an image analysis, was found to be about 0.3 μm. Further, the powder was found to have 0.41° of a half value width of (104) peak in an X-ray powder diffractometry.

An electrolyte body was prepared as in Example 1 by using the retaining material. Further, a molten carbonate fuel cell constructed as shown in FIGS. 2 and 3 was assembled by using each of the electrolyte body thus prepared. A fuel cell was subjected to a power generating test for 2000 hours under a load of 150 mA/cm$^2$ at 700° C., as in Example 1 so as to measure the operating voltage drop of the fuel cell after the test. As the result, the operating voltage drop after the test was as small as only 65 mV, supporting that the fuel cell of the present invention permits maintaining a good cell performance.

EXAMPLES 17 TO 25

The powder (retaining material) obtained in Example 4 and a reinforcing material given in Table 4 were put in an alumina pot in a volume ratio of 70 (retaining material): 30 (reinforcing material) for performing a wet mixing for 20 hours in the presence of toluene, polyvinyl butyral and dibutyl phthalate so as to obtain a slurry. The resultant slurry was spread on a carrier sheet to form a matrix green sheet having a thickness of 0.5 mm, followed by defeating the matrix green sheet under the air atmosphere so as to prepare a porous body.

On the other hand, an electrolyte sheet was prepared as in preparation of the porous body by using a mixture of alkali carbonates consisting of 62 mol % of $Li_2CO_3$ and 38 mol % of $K_2CO_3$. The electrolyte sheet was superposed on the porous body and, then, melted by heating to 550° C. so as to permit the porous body to be impregnated with the molten electrolyte consisting of the mixture of the alkali carbonates, thereby obtaining an electrolyte body having a thickness of 0.5 mm.

A molten carbonate fuel cell constructed as shown in FIGS. 2 and 3 was assembled by using the resultant electrolyte body, as in Example 1. The resultant fuel cell was subjected to a power generating test for 2000 hours under a load of 150 mA/cm² at 700° C. so as to measure the operating voltage drop after the test, as in Example 1. The result is also shown in Table 4. In addition, Table 4 shows for reference the operating voltage drop of a molten carbonate fuel cell constructed as shown in FIGS. 2 and 3, which was assembled by using an electrolyte body involving the retaining material prepared in each of Examples 1 to 4 and Comparative Examples 1 to 3 together with a reinforcing material consisting of γ-lithium aluminate particles having an average particle diameter of 15 μm.

Example 25, in which a composite material consisting of α-lithium aluminate particles and long fibers was used as a reinforcing material, was found to permit more prominently suppressing the operating voltage drop.

As described above in detail, the present invention provides a molten carbonate fuel cell, in which the change in the fine structure of the electrolyte body is suppressed so as to permit suppressing an increase in the resistance of the electrolyte body, said increased resistance accompanying the electrolyte loss, and to permit operation over a long period of time even under a pressurized condition.

The present invention also provides a method of manufacturing a retaining material adapted for the preparation of an electrolyte used in the molten carbonate fuel cell of the present invention.

What is claimed is:

1. A molten carbonate fuel cell, comprising:
   a fuel electrode;
   an oxidizing agent electrode; and
   an electrolyte body prepared by impregnating a porous body including a retaining material and a reinforcing material within an electrolyte containing an alkali carbonate;
   wherein said retaining material consists essentially of α-lithium aluminate (α-LiAlO₂) having at most 0.60° of a half value width of (104) peak in an X-ray powder diffractometry.

2. The molten carbonate fuel cell according to claim 1, wherein said retaining material contains at least 90% by weight of α-lithium aluminate.

TABLE 4

|  | Starting Material Powder | | Manufactured Powder | | Reinforcing Material | | Cell Characteristics Operating |
|---|---|---|---|---|---|---|---|
|  | Kind | Specific Surface Area (m²/g) | α-phase Content (%) | Half Value Width (°) | Kind | Shape* | Voltage Drop (mV) |
| Example 1 | α-LiAlO₂ | 40 | 95 | 0.36 | γ-LiAlO₂ | Particle | 93 |
| Example 2 | α-LiAlO₂ | 23 | 100 | 0.48 | γ-LiAlO₂ | Particle | 129 |
| Example 3 | α-LiAlO₂ | 33 | 100 | 0.39 | γ-LiAlO₂ | Particle | 60 |
| Example 4 | α-LiAlO₂ | 40 | 100 | 0.36 | γ-LiAlO₂ | Particle | 53 |
| Example 17 | α-LiAlO₂ | 40 | 100 | 0.36 | α-LiAlO₂ | Particle | 37 |
| Example 18 | α-LiAlO₂ | 40 | 100 | 0.36 | Al₂O₃ | Particle | 40 |
| Example 19 | α-LiAlO₂ | 40 | 100 | 0.36 | ZrO₂ | Particle | 34 |
| Example 20 | α-LiAlO₂ | 40 | 100 | 0.36 | Li₂ZrO₃ | Particle | 26 |
| Example 21 | α-LiAlO₂ | 40 | 100 | 0.36 | Al₂O₃ | Long Fiber | 33 |
| Example 22 | α-LiAlO₂ | 40 | 100 | 0.36 | LiAlO₂ | Long Fiber | 30 |
| Example 23 | α-LiAlO₂ | 40 | 100 | 0.36 | β-LiAlO₂ | Short Fiber | 27 |
| Example 24 | α-LiAlO₂ | 40 | 100 | 0.36 | γ-LiAlO₂ | Short Fiber | 29 |
| Example 25 | α-LiAlO₂ | 40 | 100 | 0.36 | α-LiAlO₂ | Particle + Long Fiber | 20 |
| Comparative Example 1 | α-LiAlO₂ | 17 | 3 | — | γ-LiAlO₂ | Particle | 392 |
| Comparative Example 2 | γ-LiAlO₂ | 20 | 20 | — | γ-LiAlO₂ | Particle | 253 |
| Comparative Example 3 | γ-LiAlO₂ | 20 | 0 | — | γ-LiAlO₂ | Particle | 294 |

*Reinforcing Member:
Particle — average Particle diameter of 15 μm;
Short Fiber — average diameter of 2 μm and an average length of 30 μm;
Long Fiber — average diameter of 10 μm and an average length of 0.5 mm.

As apparent from Table 4, the fuel cell for each of Examples 17 to 25 permits further suppressing the operating voltage drop, compared with the fuel cell prepared by using a retaining material equal to that used in each of Examples 1 to 4 together with a reinforcing material consisting of γ-lithium aluminate particles. Particularly, the fuel cell for 3. The molten carbonate fuel cell according to claim 1, wherein said retaining material has at most 0.45° of a half value width of (104) peak of α-lithium aluminate.

4. The molten carbonate fuel cell according to claim 1, wherein said retaining material is in the form of a powder having an average particle diameter of 0.2 to 0.6 μm.

5. The molten carbonate fuel cell according to claim 1, wherein said reinforcing material consists of particles of at least one material selected from the group consisting of α-lithium aluminate, alumina, stabilized zirconia and lithium zirconia.

6. The molten carbonate fuel cell according to claim 5, wherein said reinforcing material has an average particle diameter of 5 to 50 μm.

7. The molten carbonate fuel cell according to claim 1, wherein said reinforcing material is in the form of short fibers of at least one material selected from the group consisting of β-lithium aluminate and γ-lithium aluminate.

8. The molten carbonate fuel cell according to claim 7, wherein said reinforcing material has an average diameter of 0.5 to 5 μm and an average length of at most 50 μm.

9. The molten carbonate fuel cell according to claim 1, wherein said reinforcing material is in the form of long fibers of at least one material selected from the group consisting of alumina, lithium aluminate and zirconia.

10. The molten carbonate fuel cell according to claim 9, wherein said reinforcing material has an average diameter of 1.0 to 15 μm and an average length of 0.1 to 3 mm.

11. A retaining material for an electrolyte body included in a molten carbonate fuel cell, consisting essentially of α-lithium aluminate (α-LiAlO$_2$) having at most 0.60° of a half value width of (104) peak in an X-ray powder diffractometry.

12. The retaining material according to claim 11, wherein the amount of said α-lithium aluminate contained in said retaining material is at least 90% by weight.

13. The retaining material according to claim 11, wherein said α-lithium aluminate has at most 0.45° of a half value width of (104) peak.

14. The retaining material according to claim 11, wherein said α-lithium aluminate is in the form of powder having an average particle diameter of 0.2 to 0.6 μm.

* * * * *